(12) United States Patent
Zolotov

(10) Patent No.: US 10,587,858 B2
(45) Date of Patent: Mar. 10, 2020

(54) DEVICE AND METHOD OF DIMENSIONING USING DIGITAL IMAGES AND DEPTH DATA

(71) Applicant: SYMBOL TECHNOLOGIES, LLC, Lincolnshire, IL (US)

(72) Inventor: Serguei Zolotov, Ottawa (CA)

(73) Assignee: Symbol Technologies, LLC, Holtsville, NY (US)

( * ) Notice: Subject to any disclaimer, the term of this patent is extended or adjusted under 35 U.S.C. 154(b) by 215 days.

(21) Appl. No.: 15/069,491

(22) Filed: Mar. 14, 2016

(65) Prior Publication Data

US 2017/0264880 A1 Sep. 14, 2017

(51) Int. Cl.
*H04N 13/128* (2018.01)
*G06K 9/62* (2006.01)
(Continued)

(52) U.S. Cl.
CPC ........... *H04N 13/128* (2018.05); *G01B 11/24* (2013.01); *G06K 9/6267* (2013.01); *G06T 7/10* (2017.01);
(Continued)

(58) Field of Classification Search
CPC .. H04N 13/0022; H04N 13/128; H04N 13/20; H04N 13/271; G06T 2207/10028; G06T 17/00; G06T 7/194; G06T 7/62; G06T 7/60; G06T 7/12; G06T 7/593; G06T 7/10; G01B 11/002; G01B 11/005; G01B 11/04; G01B 11/043; G01B 11/046; G01B 11/24; G06K 9/26267
See application file for complete search history.

(56) References Cited

U.S. PATENT DOCUMENTS 4,611,292 A * 9/1986 Ninomiya .............. B25J 19/023
348/94
6,226,396 B1 * 5/2001 Marugame ......... G06K 9/00228
382/154
(Continued)

FOREIGN PATENT DOCUMENTS

WO WO-2012008618 A1 * 1/2012 ........... G01B 11/002
WO WO-2013146269 A1 * 10/2013 ........... G01B 11/043
WO WO-2015193711 A1 * 12/2015 ........... G01B 21/042

OTHER PUBLICATIONS

SoftKinetic Depthsense Cameras brochure copyright 2007-2015.
(Continued)

*Primary Examiner* — David E Harvey

(57) ABSTRACT

A device and method of dimensioning using digital images and depth data is provided. The device includes a camera and a depth sensing device whose fields of view generally overlap. Segments of shapes belonging to an object identified in a digital image from the camera are identified. Based on respective depth data, from the depth sensing device, associated with each of the segments of the shapes belonging to the object, it is determined whether each of the segments is associated with a same shape belonging to the object. Once all the segments are processed to determine their respective associations with the shapes of the object in the digital image, dimensions of the object are computed based on the respective depth data and the respective associations of the shapes.

19 Claims, 10 Drawing Sheets

(51) Int. Cl.
  *G06T 7/60* (2017.01)
  *G01B 11/24* (2006.01)
  *G06T 7/10* (2017.01)
  *H04N 13/271* (2018.01)
  *G06T 7/593* (2017.01)
  *G06T 7/12* (2017.01)
  *H04N 13/20* (2018.01)
  *H04N 13/00* (2018.01)
  *H04N 13/204* (2018.01)

(52) U.S. Cl.
  CPC ............... *G06T 7/12* (2017.01); *G06T 7/593* (2017.01); *G06T 7/60* (2013.01); *H04N 13/20* (2018.05); *H04N 13/271* (2018.05); *G06T 2207/10021* (2013.01); *G06T 2207/10024* (2013.01); *G06T 2207/10028* (2013.01); *G06T 2207/20061* (2013.01); *G06T 2207/20076* (2013.01); *H04N 13/204* (2018.05); *H04N 2013/0074* (2013.01); *H04N 2013/0092* (2013.01)

(56) References Cited

U.S. PATENT DOCUMENTS

| | | | | |
|---|---|---|---|---|
| 6,377,353 | B1* | 4/2002 | Ellis | A01K 11/006 348/135 |
| 6,420,698 | B1* | 7/2002 | Dimsdale | G01S 7/4811 250/205 |
| 6,526,166 | B1* | 2/2003 | Gorman | G06T 7/80 345/427 |
| 6,995,762 | B1 | 2/2006 | Pavlidis et al. | |
| 7,263,209 | B2* | 8/2007 | Camus | G06K 9/00201 340/425.5 |
| 8,290,231 | B2* | 10/2012 | Garg | G06K 9/4604 382/131 |
| 9,007,368 | B2* | 4/2015 | Laffargue | G06T 17/20 345/419 |
| 9,478,030 | B1* | 10/2016 | Lecky | G06Q 10/08 |
| 9,886,528 | B2* | 2/2018 | Rameau | G06T 17/00 |
| 10,008,004 | B1* | 6/2018 | Duan | G06K 9/00201 |
| 10,091,489 | B2* | 10/2018 | Murayama | G01B 11/043 |
| 10,212,408 | B1* | 2/2019 | Pappas-Katsiafas | G06T 7/004 |
| 2002/0110272 | A1* | 8/2002 | Brodsky | G06T 7/564 382/154 |
| 2004/0008259 | A1* | 1/2004 | Gokturk | G01B 11/2509 348/207.1 |
| 2005/0013465 | A1* | 1/2005 | Southall | G06K 9/00624 382/103 |
| 2005/0257748 | A1* | 11/2005 | Kriesel | A01K 11/008 119/51.02 |
| 2005/0264557 | A1* | 12/2005 | Kise | G06K 9/00201 345/419 |
| 2006/0056679 | A1* | 3/2006 | Redert | G06K 9/20 382/154 |
| 2007/0285672 | A1* | 12/2007 | Mukai | G01B 11/2518 356/603 |
| 2008/0140234 | A1* | 6/2008 | Shafter | G06Q 10/10 700/91 |
| 2008/0240547 | A1* | 10/2008 | Cho, II | G05D 1/0251 382/153 |
| 2009/0238404 | A1* | 9/2009 | Orderud | G16H 50/50 382/103 |
| 2010/0079450 | A1* | 4/2010 | Pizlo | G06K 9/32 345/419 |
| 2010/0302247 | A1* | 12/2010 | Perez | G06K 9/00201 345/440 |
| 2011/0080336 | A1* | 4/2011 | Leyvand | G06K 9/469 345/156 |
| 2011/0142328 | A1 | 6/2011 | Friedhoff et al. | |
| 2011/0175984 | A1* | 7/2011 | Tolstaya | G06K 9/38 348/46 |
| 2011/0285910 | A1* | 11/2011 | Bamji | G01S 17/89 348/631 |
| 2012/0033873 | A1* | 2/2012 | Ozeki | G06K 9/00214 382/154 |
| 2013/0051658 | A1* | 2/2013 | Hwang | G06K 9/00201 382/154 |
| 2013/0108121 | A1* | 5/2013 | de Jong | G06Q 30/06 382/111 |
| 2013/0124148 | A1* | 5/2013 | Jin | G06F 17/5086 703/1 |
| 2013/0179288 | A1* | 7/2013 | Moses | G06Q 10/00 705/26.1 |
| 2013/0223673 | A1* | 8/2013 | Davis | G06K 9/78 382/100 |
| 2013/0226334 | A1* | 8/2013 | Okamoto | H01L 21/67253 700/225 |
| 2013/0230235 | A1* | 9/2013 | Tateno | G06T 19/003 382/154 |
| 2013/0329013 | A1* | 12/2013 | Metois | G01B 11/00 348/46 |
| 2014/0104413 | A1* | 4/2014 | McCloskey | G06Q 10/083 348/135 |
| 2014/0104416 | A1* | 4/2014 | Giordano | G01B 11/02 348/135 |
| 2014/0118335 | A1* | 5/2014 | Gurman | H04N 13/204 345/419 |
| 2015/0023602 | A1* | 1/2015 | Wnuk | G06F 17/30247 382/190 |
| 2015/0063676 | A1* | 3/2015 | Lloyd | G01B 11/24 382/141 |
| 2015/0063679 | A1* | 3/2015 | Cook | G06F 3/04815 382/154 |
| 2015/0093018 | A1* | 4/2015 | Macciola | G06T 3/00 382/154 |
| 2015/0154453 | A1* | 6/2015 | Wilf | G06K 9/00711 382/103 |
| 2015/0187091 | A1* | 7/2015 | Hata | G01B 11/02 382/101 |
| 2015/0332075 | A1* | 11/2015 | Burch | G06K 7/10821 345/156 |
| 2016/0012278 | A1* | 1/2016 | Banhazi | A01K 29/00 382/110 |
| 2016/0073080 | A1* | 3/2016 | Wagner | H04N 13/0011 348/47 |
| 2016/0109219 | A1* | 4/2016 | Ackley | G01B 11/022 348/136 |
| 2016/0238380 | A1* | 8/2016 | Hatada | G01B 11/0608 |
| 2016/0249041 | A1* | 8/2016 | Zhou | G06T 7/536 |
| 2017/0116571 | A1* | 4/2017 | Tammattabattula | G06Q 10/0835 |
| 2017/0154204 | A1* | 6/2017 | Ryu | G06K 9/00208 |
| 2017/0178305 | A1* | 6/2017 | Silver | G06T 5/002 |
| 2017/0220887 | A1* | 8/2017 | Fathi | G06K 9/00201 |
| 2017/0264880 | A1* | 9/2017 | Zolotov | G06K 9/6267 |
| 2017/0372489 | A1* | 12/2017 | Tabuchi | G06T 7/62 |
| 2019/0005668 | A1* | 1/2019 | Sugimura | G06T 7/55 |
| 2019/0033058 | A1* | 1/2019 | Tsurumi | G01B 11/02 |

OTHER PUBLICATIONS

Dave Wilson "Time of Flight Cameras Take on Industrial Applications", Jun. 15, 2015.

International Search Report and Written Opinion for corresponding International Patent Application No. PCT/US2016/068203 dated Mar. 23, 2017.

Lu et al: "Detecting textured objects using convex hull", Machine Visions and Applications, vol. 18, No. 2, pp. 123-133 (Jan. 25, 2007).

* cited by examiner

DEVICE AND METHOD OF DIMENSIONING USING DIGITAL IMAGES AND DEPTH DATA

BACKGROUND

Digital cameras are commonly used on mobile devices. Depth sensing cameras are generally not used on mobile devices; however depth sensing cameras (such as time-of-flight cameras, structured light cameras, stereo cameras) can be used to measure object dimensions. Measuring object dimensions with depth sensing cameras, however, can require high quality and/or expensive components to deliver high precision data to compete with common ruler measurements. Furthermore, many of such depth sensing cameras have inherent problems. For example, depth sensing cameras that use structured light are subject to interference with ambient light; in addition, their precision declines with the distance to a physical object being dimensioned; and an ASIC (application-specific integrated circuit) is required to calculate depth data from the many structured light images that are acquired. Furthermore, stereo cameras can require a significant baseline for accurate measurements, that are then subject to low light degradation; and image correspondence problems can necessitate hardware acceleration. Time-of-flight cameras can be subject to noise, reflections and light interference; furthermore, accurate dimensioning measurements can require precise corners of the physical object being measured, and the time-of-flight can further provide poor results at edges of the physical object.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate implementations of concepts described herein, and explain various principles and advantages of those implementations.

Figure 1:
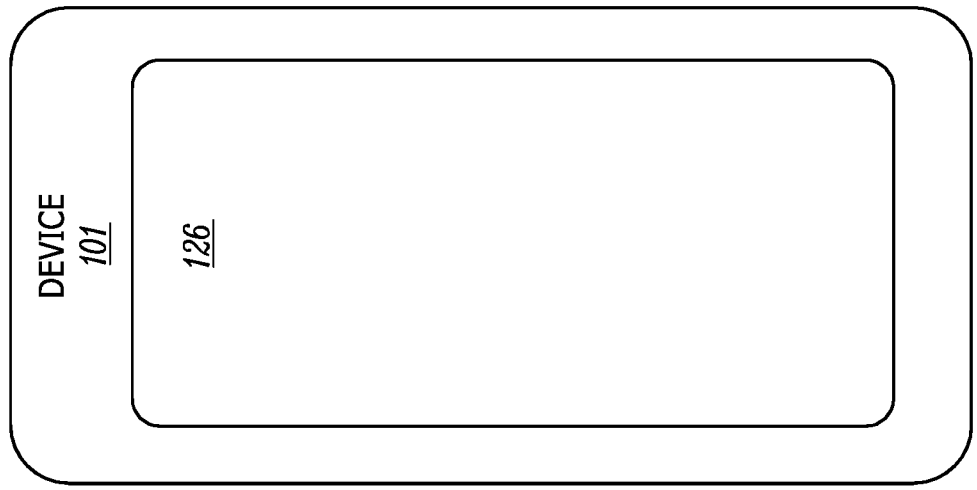
FIG. 1 depicts front and rear views of a hybrid device for dimensioning using digital images and depth data, in accordance with some implementations.
Figure 1:
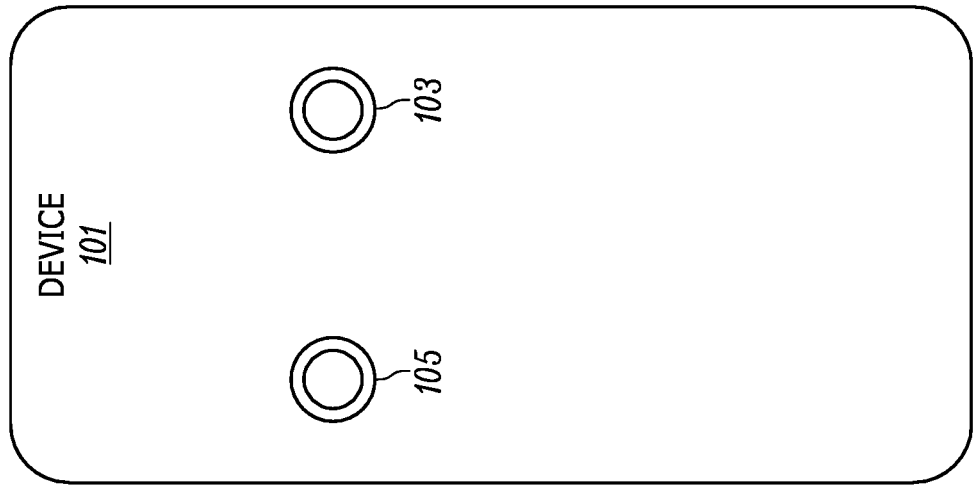

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present specification.

The apparatus and method components have been represented where appropriate by conventional symbols in the drawings, showing only those specific details that are pertinent to understanding the implementations of the present specification so as not to obscure the disclosure with details that will be readily apparent to those of ordinary skill in the art having the benefit of the description herein.

DETAILED DESCRIPTION

An aspect of the specification provides a device comprising: a camera device configured to acquire a digital image in a field of view; a depth sensing device configured to acquire depth data across at least a portion of the field of view of the camera device; and, a dimensioning processor configured to: determine segments of shapes belonging to an object identified in the digital image; based on respective depth data, from the depth sensing device, associated with each of the segments of the shapes belonging to the object, determine whether each of the segments is associated with a same shape belonging to the object; and, once all the segments are processed to determine their respective associations with the shapes of the object in the digital image, compute dimensions of the object based on the respective depth data and the respective associations of the shapes.

The dimensioning processor can be further configured to determine whether each of the segments is associated with the same shape belonging to the object by: identifying adjacent segments of the shapes belonging to the object identified in the digital image; and, comparing at least a portion of the respective depth data of the adjacent segments.

The dimensioning processor can be further configured to determine whether each of the segments is associated with the same shape belonging to the object by: iterating through all adjacent segments of the segments to determine whether the adjacent segments can be joined into a larger super-segment of the same shape.

The dimensioning processor can be further configured to determine whether each of the segments is associated with the same shape belonging to the object by: determining, based on the respective depth data, whether adjacent segments are co-located with the same shape.

The dimensioning processor can be further configured to filter out one or more of identified shapes and identified segments that are not associated with the object.

The device can further comprise a display device, and the dimensioning processor can be further configured to control the display device to one or more of: render the digital image; identify the object in the digital image; and render the dimensions of the object.

The device can further comprise a memory storing data defining the object, and the dimensioning processor can be further configured to: identify the object in the digital image by comparing the digital image with the data defining the object. The data defining the object can be stored in a container in the memory, the container being one of a plurality of containers stored in the memory, each of the plurality of containers defining respective objects. The data defining the object can comprise stereometric properties of the object, the stereometric properties comprising a set of one or more of quantitative descriptions and qualitative descriptions of the object that uniquely characterize the object in three-dimensions.

The dimensioning processor can be further configured to determine geometry of the object based on relative location of the segments of the object in the digital image and in the depth data.

Each of the shapes can comprises one or more of: a primitive shape, a plane, a triangle, a square, a rectangle, a circle, a sphere, and a polygon.

The dimensioning processor can be further configured to preprocess the digital image to one or more of: filter image noise; detect edges of the object; segment color; determine morphological features in the digital image; and determine orientation of lines in the digital image.

The dimensioning processor can be further configured to preprocess the depth data to one or more of: correct for distortions; correct for interference; filter noise; and convert the depth data to point cloud data format.

The camera device can comprise an RGB (red-green-blue) digital camera.

The depth sensing device can comprises one or more of a structured light camera, a time-of-flight camera, stereo vision camera, an active stereo vision camera, a passive stereo vision camera, a stereoscopic camera, and a LIDAR (light detection and ranging) device.

Another aspect of the specification provides a method comprising: at a device comprising: a camera device configured to acquire a digital image in a field of view; a depth sensing device configured to acquire depth data across at least a portion of the field of view of the camera device; and, a dimensioning processor, determining, at the dimensioning processor, segments of shapes belonging to an object identified in the digital image; based on respective depth data, from the depth sensing device, associated with each of the segments of the shapes belonging to the object, determining, at the dimensioning processor, whether each of the segments is associated with a same shape belonging to the object; and, once all the segments are processed to determine their respective associations with the shapes of the object in the digital image, computing, at the dimensioning processor, dimensions of the object based on the respective depth data and the respective associations of the shapes.

The determining whether each of the segments is associated with the same shape belonging to the object can occur by: identifying adjacent segments of the shapes belonging to the object identified in the digital image; and, comparing at least a portion of the respective depth data of the adjacent segments.

The determining whether each of the segments is associated with the same shape belonging to the object can occur by: iterating through all adjacent segments of the segments to determine whether the adjacent segments can be joined into a larger super-segment of the same shape.

The determining whether each of the segments is associated with the same shape belonging to the object can occur by: determining, based on the respective depth data, whether adjacent segments are co-located with the same shape.

The method can further comprise filtering out one or more of identified shapes and identified segments that are not associated with the object.

The device can further comprise a display device, and the method can further comprise controlling the display device to one or more of: render the digital image; identify the object in the digital image; and render the dimensions of the object.

The device can further comprise a memory storing data defining the object, and the method can further comprise: identifying the object in the digital image by comparing the digital image with the data defining the object. The data defining the object can be stored in a container in the memory, the container being one of a plurality of containers stored in the memory, each of the plurality of containers defining respective objects. The data defining the object can comprise stereometric properties of the object, the stereometric properties comprising a set of one or more of quantitative descriptions and qualitative descriptions of the object that uniquely characterize the object in three-dimensions.

The method can further comprise determining geometry of the object based on relative location of the segments of the object in the digital image and in the depth data.

Each of the shapes can comprises one or more of: a primitive shape, a plane, a triangle, a square, a rectangle, a circle, a sphere, and a polygon.

The method can further comprise preprocessing the digital image to one or more of: filter image noise; detect edges of the object; segment color; determine morphological features in the digital image; and determine orientation of lines in the digital image.

The method can further comprise preprocessing the depth data to one or more of: correct for distortions; correct for interference; filter noise; and convert the depth data to point cloud data format.

The camera device can comprise an RGB (red-green-blue) digital camera.

The depth sensing device can comprises one or more of a structured light camera, a time-of-flight camera, stereo vision camera, an active stereo vision camera, a passive stereo vision camera, a stereoscopic camera, and a LIDAR (light detection and ranging) device.

Yet a further aspect of the speciation provides a non-transitory computer-readable medium storing a computer program, wherein execution of the computer program is for: at a device comprising: a camera device configured to acquire a digital image in a field of view; a depth sensing device configured to acquire depth data across at least a portion of the field of view of the camera device; and, a dimensioning processor, determining, at the dimensioning processor, segments of shapes belonging to an object identified in the digital image; based on respective depth data, from the depth sensing device, associated with each of the segments of the shapes belonging to the object, determining, at the dimensioning processor, whether each of the segments is associated with a same shape belonging to the object; and, once all the segments are processed to determine their respective associations with the shapes of the object in the digital image, computing, at the dimensioning processor, dimensions of the object based on the respective depth data and the respective associations of the shapes.

Figure 2:
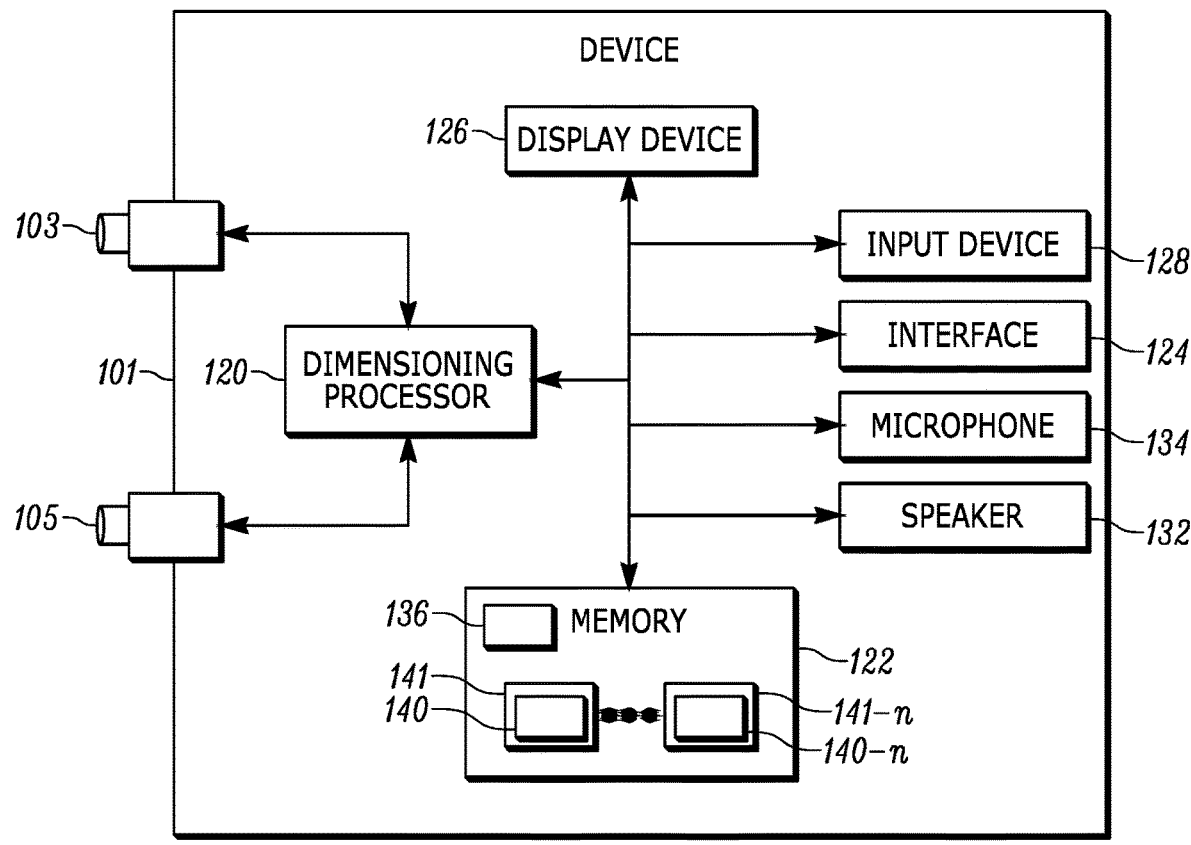
FIG. 2 depicts a schematic block diagram of the device of FIG. 1, in accordance with some implementations.

FIG. 1 depicts a rear perspective view 1-I and a front perspective view 1-II of a dimensioning device 101; FIG. 2 depicts a schematic block diagram of device 101. With reference to both FIG. 1 and FIG. 2, the dimensioning device 101 comprises: a camera device 103 configured to acquire a digital image in a field of view; a depth sensing device 105 configured to acquire depth data across at least a portion of the field of view of the camera device 103; and, a dimensioning processor 120 configured to: determine segments of shapes belonging to an object identified in the digital image; based on respective depth data, from depth sensing device 105, associated with each of the segments of the shapes belonging to the object, determine whether each of the segments is associated with a same shape belonging to the object; and, once all the segments are processed to determine their respective associations with the shapes of the object in the digital image, compute dimensions of the object based on the respective depth data and the respective associations of the shapes. Camera device 103 will be interchangeably referred to hereafter as camera 103; and dimensioning processor 120 will be interchangeably referred to hereafter as dimensioning processor 120.

As depicted, device 101 further comprises a memory 122, a communication interface 124 (interchangeably referred to as interface 124), a display device 126, at least one input device 128, a speaker 132 and a microphone 134.

Device 101, and its components, will now be described in further detail.

Device 101 can comprise a computing device specially configured for object dimensioning, including but not limited to a graphics processing unit (GPU), a graphics processing device, a graphics processing engine, a video processing device, and the like. Indeed, device 101 can be any type of electronic device that can be used in a self-contained manner to acquire images and depth data using, respectively, camera 103 and depth sensing device 105, to dimension objects in a field of view of camera 103 and depth sensing device 105.

Device 101 can include, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances, mobile camera devices and the like that are specially configured for object dimensioning. Other suitable devices are within the scope of present implementations. For example, device 101 need not comprise a mobile communication device, but rather can comprise a device with specialized functions, for example a device having warehouse inventory tracking and/or other data acquisition functionality, such as a mobile scanner having one or more of radio frequency identification (RFID) reader, Near Field Communication (NFC) reader, imager, and/or laser-based scanner data acquisition components.

While a specific physical configuration of device 101 is depicted in FIG. 1, other physical configurations of device 101 are within the scope of present implementations. For example, device 101 can further include one or more handles, such as a handle below the display 126, as well as a trigger for triggering the data acquisition components and the like.

Camera 103 can comprise a digital camera, an RGB (red-green-blue) digital camera, and the like, configured to acquire digital images, including, but not limited to, images in a video stream. While details of camera 103 are not depicted, it is assumed that camera 103 comprises components for acquiring digital images including, but not limited to, respective charge coupled devices (CCD) and the like, as well as respective lenses, respective focusing devices (including, but not limited to voice coils and the like), etc. Hence, data from camera 103 generally comprises two-dimensional data, and specifically a two-dimensional array of values which can comprise an array of two-dimensional color coordinates and/or brightness coordinates.

Depth sensing device 105 can comprise comprises one or more of a structured light camera, a time-of-flight camera, a stereo vision camera, an active stereo vision camera (which can project its own light, including, but not limited to, infrared light), a passive stereo vision camera (which relies on ambient light), a stereoscopic camera, and a LIDAR (light detection and ranging) device. However, other depth sensing devices are within the scope of present implementations. In some implementations, depth sensing device 105 can comprise a pair of cameras, which can include camera 103, that form a stereo vision camera and/or a stereoscopic camera. When depth sensing device 105 comprises a structured light camera, depth sensing device 105 can include a device configured to project structured light and a camera, which can include camera 103 configured to capture images of physical objects illuminated by the structured light. When depth sensing device 105 comprises a time-of-flight (ToF) camera or a LIDAR device, depth sensing device 105 comprises components for implanting such functionality. Furthermore, depth sensing device 105 can include components for acquiring depth data across a field of view including, but not limited to, respective charge coupled devices (CCD) and the like, as well as respective lenses, and respective focusing devices (including, but not limited to voice coils and the like).

Depth sensing device 105 is configured to sense depth across a field of view, such that a distance from depth sensing device 105 to surfaces of a physical object can be determined. In particular, depth data from depth sensing device 105 could be processed to produce a three-dimensional map of the field of view of depth sensing device 105, however such processing to produce a three-dimensional map of the field of view of depth sensing device 105 can be obviated by present implementations. Hence, data from depth sensing device 105 can be referred to as three-dimensional data and can comprise a two-dimensional array of depth coordinates (i.e. each element in the two-dimensional array is associated with a corresponding depth).

Hence, depth data from depth sensing device 105 generally represents a distance from the depth sensing device 105 to portions of objects in the field of view of depth sensing device 105. In some implementations the depth data can comprise, and/or be converted to, "real world coordinates" which can comprise three-dimensional coordinates in a selected reference frame and/or a given reference frame; in some implementation such a reference frame can be relative to depth sensing device 105 (e.g. depth sensing device 105 can comprise an origin of the reference frame), while in other implementations, such a reference frame can be relative to a fixed coordinate, for example a point in warehouse and/or a geographical coordinate determined using a Global Positioning System (GPS) device. In the latter implementations, device 101 can comprise a GPS device, and coordinates of depth data from depth sensing device 105 can be determined relative to an origin defined with respect to GPS data.

As depicted in FIG. 1, external components of each of camera 103 and depth sensing device 105 can be located on a rear side of device 101, and display device 126 can be looked on a front side of device 101, such that digital images and depth data can be captured at a rear side of device 101. Put another way, fields of view of each of camera 103 and depth sensing device 105 overlap as both devices 103, 105 are disposed at a rear side of device 101. However, both devices 103, 105 need not be disposed on a same side of device 101 as long as fields of view of each of devices 103, 105 overlap such that an object being dimensioned by dimensioning device 101 is in a field of view of each of devices 103, 105.

Furthermore, as also depicted in FIG. 1, image capturing components and/or data capturing components of each of camera 103 and depth sensing device 105, such as lenses and the like, can be separated by a given distance such that images from camera 103 and depth data from depth sensing device 105 generally image and/or sense depth across a similar field of view. In other words, respective fields of view of camera 103 and depth sensing device 105 generally overlap, and indeed, in some implementations, lenses, and the like, of each of camera 103 and depth sensing device 105 are as close together as possible both to reduce parallax therebetween and to ensure that depth data can be captured for an object imaged by camera 103.

It is appreciated that the locations of each of camera 103 and depth sensing device 105 in each of FIG. 1 and FIG. 2 are merely schematic and do not necessarily represent actual relative positions of each of camera 103 and depth sensing device 105; in other words, in FIG. 1, while each of camera 103 and depth sensing device 105 are depicted as side by side across a transverse longitudinal of device 101, each of camera 103 and depth sensing device 105 can be located anywhere on device 101, presuming that their fields of view at least partially overlap such that physical objects in their respective fields of view can be both imaged by camera 103 and sensed by depth sensing device 105.

In an ideal device, camera 103 and depth sensing device 105 would occupy the same point in space such that their respective fields of view would be identical; however, as that is not practical, one implementation includes an RGB camera (e.g. camera 103) and a ToF camera. Furthermore, such a configuration leads to preprocessing of respective digital images and depth data to align corresponding areas and/or pixels, to attempt to minimize "pixel shadowing" and "dark regions". For example, due to parallax in view points between camera 103 and depth sensing device 105, in some cases of arrangements of object in their field of view, regions that are visible to camera 103 are not visible to depth sensing device 105, or vice versa. This can cause: an absence of image data in regions for which there is depth data; and/or an absence of depth data in regions for which there is image data. Such regions can be referred to as "dark" as it is generally difficult to associate them with any segment. Larger "dark regions" can hence distort data being processed using techniques described herein, so closest possible co-location of camera 103 and depth sensing device 105 is desired in such an implementation.

Dimensioning processor 120 can comprise a processor and/or a plurality of processors, including but not limited to one or more central processors (CPUs) and/or one or more processing units and/or one or more graphic processing units (GPUs); either way, dimensioning processor 120 comprises a hardware element and/or a hardware processor. Indeed, in some implementations, dimensioning processor 120 can comprise an ASIC (application-specific integrated circuit) and/or an FPGA (field-programmable gate array) specifically configured to implement the functionality of device 101. Hence, device 101 is preferably not a generic computing device, but a device specifically configured to implement specific functionality including dimensioning using digital images and depth data as described in further detail below. For example, device 101 and/or dimensioning processor 120 can specifically comprise a computer executable engine configured to dimension objects in a field of view of camera 103 and depth sensing device 105 using digital images and depth data.

Memory 122 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by dimensioning processor 120 which makes appropriate utilization of volatile storage during the execution of such programming instructions. Those skilled in the art recognize that memory 122 is an example of computer readable media that can store programming instructions executable on dimensioning processor 120. Furthermore, memory 122 is also an example of a memory unit and/or memory module and/or a non-volatile memory.

In particular, memory 122 can store an application 136 that, when executed by dimensioning processor 120, enables dimensioning processor 120 to: determine segments of shapes belonging to an object identified in the digital image; based on respective depth data, from depth sensing device 105, associated with each of the segments of the shapes belonging to the object, determine whether each of the segments is associated with a same shape belonging to the object; and, once all the segments are processed to determine their respective associations with the shapes of the object in the digital image, compute dimensions of the object based on the respective depth data and the respective associations of the shapes.

As depicted, memory 122 further stores data 140 defining an object, for example an object in a digital image acquired by camera 103; dimensioning processor 120 can hence be further configured to: identify the object in the digital image by comparing the digital image with data 140 defining the object. For example, data 140 defining the object can be stored in a container 141 in memory 122; in some of these implementations, as depicted, container 141 can be one of a plurality of containers 141-$n$ stored in memory 122, each of the plurality of containers 141-$n$ defining respective objects, for example in respective data 140-$n$ stored therein.

In some implementations, data 140, 140-$n$ defining the object can comprise stereometric properties of the object, the stereometric properties comprising a set of one or more of quantitative descriptions and qualitative descriptions of the object that uniquely characterize the object in three-dimensions (i.e. relating the object represented in the digital image and the depth data to a physical object being imaged).

Qualitative descriptions can include one or more sets of rules that can be used in an object (and/or target) description algorithm. For example, when a target object has straight lines (as in the case of a box), a segment extraction algorithm can include, but is not limited to, using a probabilistic Hough transform to analyze lines and to outline object segments.

Quantitative descriptions can include one or more sets numerically expressed parameters that can describe an object. For example, when a target object has straight angles (as in the case of a box), a segment extraction algorithm can be used which indicates 90 degrees as a primary basket for classifying line relations in an image.

For example, planes can be characterized by one or more of: a three-dimensional normal vector having a length that is the distance from the center of the reference frame; and/or as an unbounded continuous three-dimensional object with any four points belonging to a quadrilateral. Indeed, any description of an object can be defined in data 140, 140-$n$ presuming that such a description distinctively defines the object and is configured to be used with methods and processes described herein.

While "n" containers of data are depicted in FIG. 1, it is appreciated that any number of containers of data can be stored at memory 122 (and/or it is appreciated that data can also be stored without containers. In particular, memory 122 can be preconfigured with data 140 storing definitions of one or more objects for which dimensions are to be determined; for example, in warehousing applications, it can be assumed that boxes are to be dimensioned, hence data 140 can define a box (e.g. an object having six sides that are joined by about 90° angles). However, other types of objects that are to be dimensioned can be defined by data 140-n, including objects that are of more complex shapes then boxes. In any event, it will be assumed hereafter that boxes are to be dimensioned and data 140 defines a box.

Dimensioning processor 120 can be further configured to communicate with display device 126, which comprises any suitable one of, or combination of, flat panel displays (e.g. LCD (liquid crystal display), plasma displays, OLED (organic light emitting diode) displays, capacitive or resistive touchscreens, CRTs (cathode ray tubes) and the like. In particular, dimensioning processor 120 can be configured to control display device 126 to one or more of: render a digital image from camera 103; identify an object in the digital image; and render the dimensions of the object, presuming such dimensions have been determined, as described in further detail below.

Device 101 generally comprises at least one input device 128 configured to receive input data, and can comprise any suitable combination of input devices, including but not limited to a keyboard, a keypad, a pointing device, a mouse, a track wheel, a trackball, a touchpad, a touch screen (e.g. integrated with display device 126), and the like. Other suitable input devices are within the scope of present implementations. In some implementations, one or more of input device 128 and display device 126 can be external to device 101, with dimensioning processor 120 in communication with any external components via a suitable connection and/or link.

As depicted, device 101 further comprises an optional speaker 132 and an optional microphone 134 (either of which can alternatively be external to device 101). Speaker 132 comprises any suitable speaker for converting audio data to sound to provide one or more of audible alerts, audible communications from remote communication devices, and the like. Microphone 134 comprises any suitable microphone for receiving sound and converting to audio data. Speaker 132 and microphone 134 can be used in combination to implement telephone and/or communication functions at device 101.

As depicted, dimensioning processor 120 also connects to optional interface 124, which can be implemented as one or more radios and/or connectors and/or network adaptors, configured to wirelessly communicate with one or more communication networks (not depicted). It will be appreciated that interface 124 is configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, Bluetooth™ links, NFC (near field communication) links, WLAN (wireless local area network) links, WiFi links, WiMax links, packet based links, the Internet, analog networks, the PSTN (public switched telephone network), access points, and the like, and/or a combination.

While not depicted, device 101 further comprises a power supply, including, but not limited to, a battery, a power pack and the like, and/or a connection to a mains power supply and/or a power adaptor (e.g. and AC-to-DC (alternating current to direct current) adaptor). In general the power supply powers components of device 101.

Hence, it should be understood that in general a wide variety of configurations for device 101 are contemplated.

Figure 3:
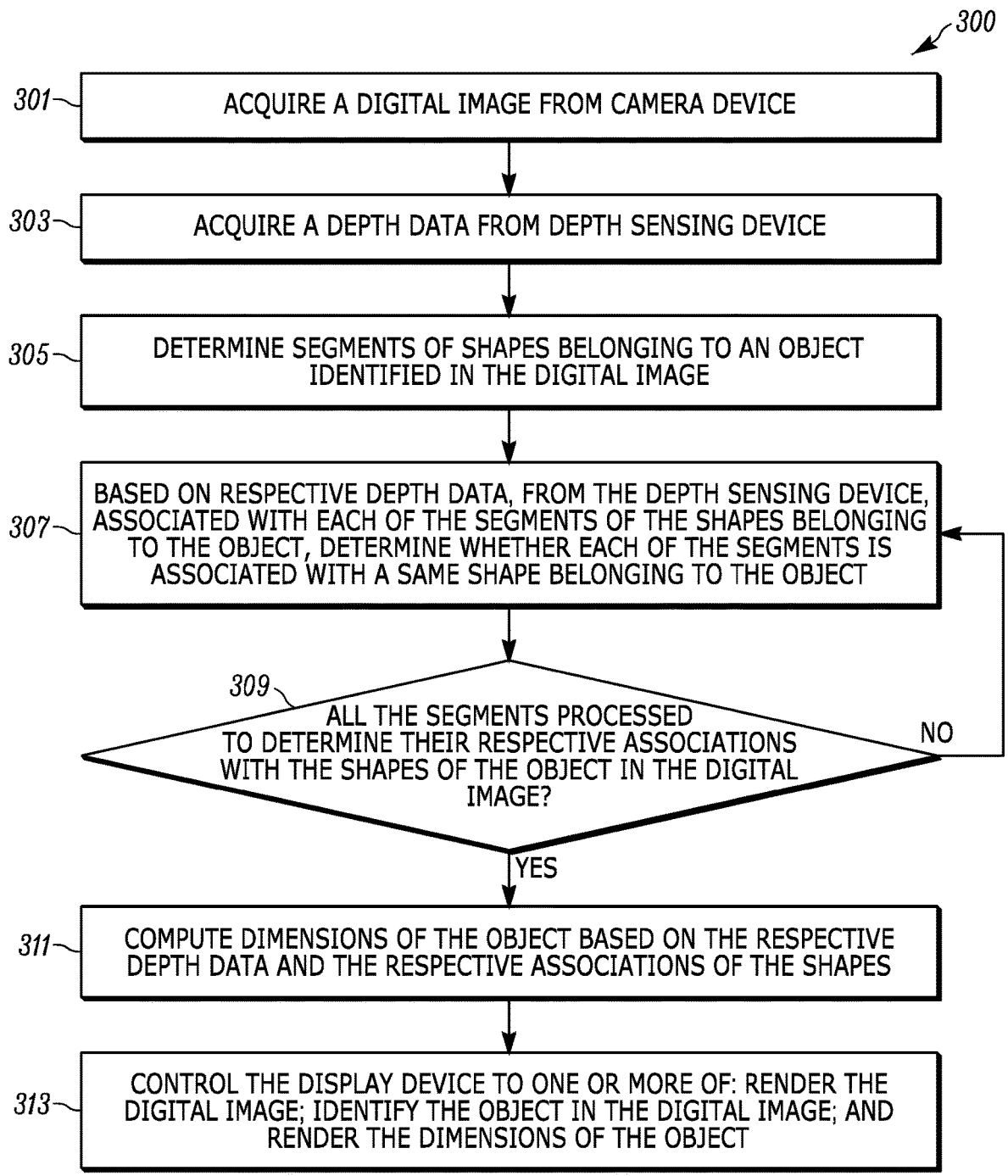
FIG. 3 is a flowchart of a method of dimensioning using digital images and depth data, in accordance with some implementations.

Attention is now directed to FIG. 3 which depicts a block diagram of a flowchart of a method 300 for dimensioning using digital images and depth data, according to non-limiting implementations. In order to assist in the explanation of method 300, it will be assumed that method 300 is performed using device 101, and specifically by dimensioning processor 120 and when dimensioning processor 120 processes instructions stored at memory 122, for example application 136. Indeed, method 300 is one way in which device 101 can be configured. Furthermore, the following discussion of method 300 will lead to a further understanding of device 101, and its various components. However, it is to be understood that device 101 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of device 101 as well.

At blocks 301, 303, which can be performed sequentially and/or in parallel, dimensioning processor 120 receives a digital image from camera device 103 and corresponding depth data from depth sensing device 105.

At block 305, dimensioning processor 120 determines segments of shapes belonging to an object identified in the digital image. For example, a segment can comprise an object identified in the digital image during an intermediate stage of segmentation. In some instances, a segment can include, but is not limited to, blob of indeterminate shape on a side and/or a surface of an object in the digital image that is identified in an initial processing of the digital image, which is identified for future analysis. As will be described hereafter, several segments can be combined into a given shape belonging to the object in the digital image, and the given shape can define a side of the object in the digital image; indeed, it can sometimes be assumed that one shape is associated with one side of the object, unless, for example, the object is curved (e.g. a sphere) with no distinguishable sides, where segments can nonetheless still be combined into shapes.

At block 307, based on respective depth data, from the depth sensing device, associated with each of the segments of the shapes associated with the object, dimensioning processor 120 determines whether each of the segments is associated with a same shape associated with the object. Put another way, at block 307, based on respective depth data corresponding to each of the segments of the shapes that define a given object, dimensioning processor 120 determines whether each of the segments is associated with a same shape that forms at least a part of the object.

At block 309, dimensioning processor 120 determines whether all the segments are processed to determine their respective associations with the shapes of the object in the digital image. When all the segments have not been processed (e.g. a "NO" decision at block 309), block 307 continues.

However, once all the segments are processed to determine their respective associations with the shapes of the object in the digital image (e.g. a "YES" decision at block 309), at block 311, dimensioning processor 120 computes dimensions of the object based on the respective depth data and the respective associations of the shapes.

At an optional block 313, dimensioning processor 120 can control display device 126 to one or more of: render the digital image; identify the object in the digital image; and render the dimensions of the object. Alternatively, and/or in addition to block 313, dimensioning processor 120 can store, at memory 122, one or more of the digital image and the dimensions of the object. Alternatively, and/or in addition to block 313, dimensioning processor 120 can transmit, using interface 124, one or more of the digital image and the dimensions of the object, for example to an external device and/or a remote device; such transmission of one or more of the digital image and the dimensions of the object can occur in conjunction with cloud-based warehousing applications and/or cloud-based warehousing functionality.

Figure 4:
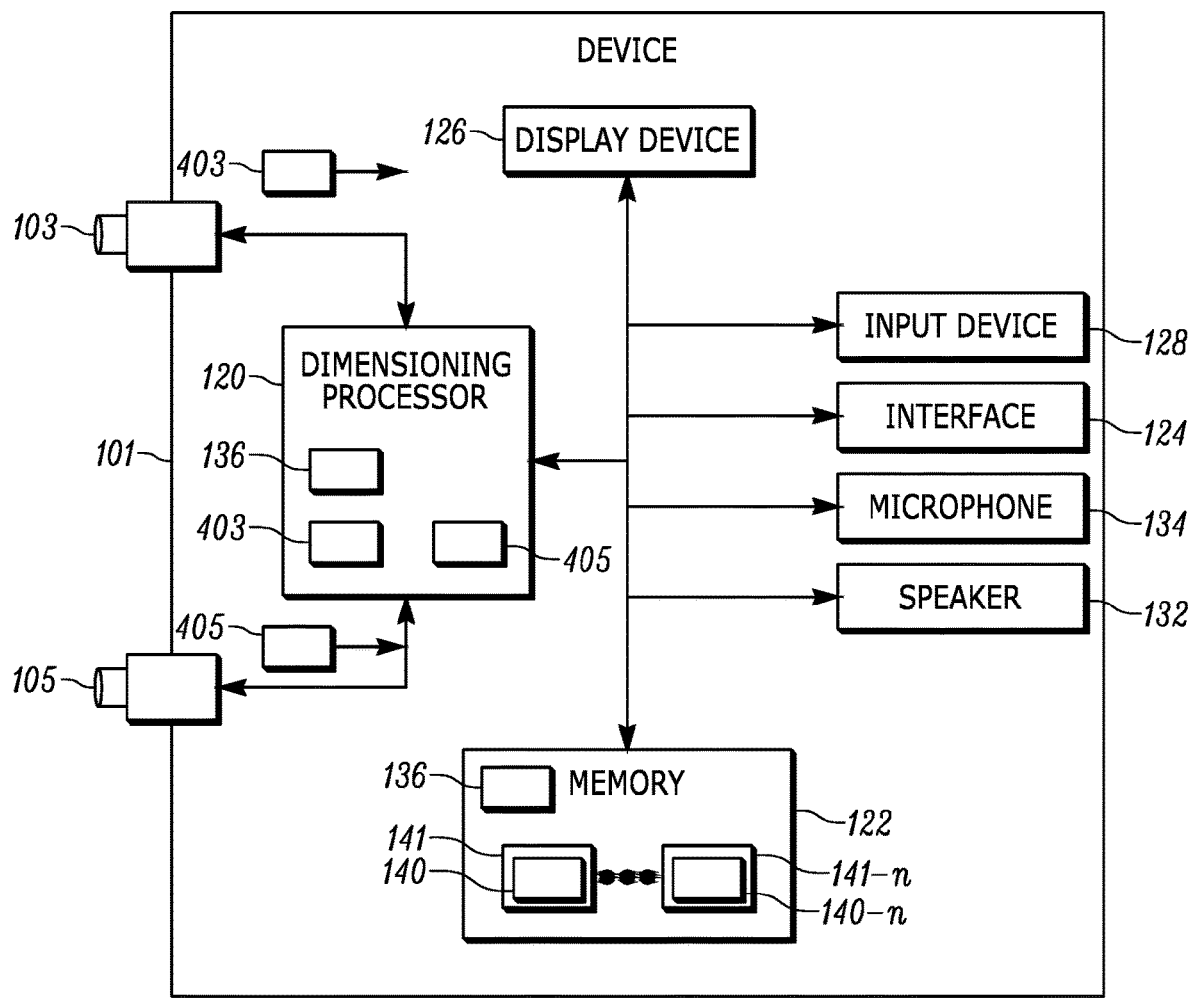
FIG. 4 depicts the device of FIG. 2 acquiring a digital image and depth data of a physical object, in accordance with some implementations.
Figure 4:
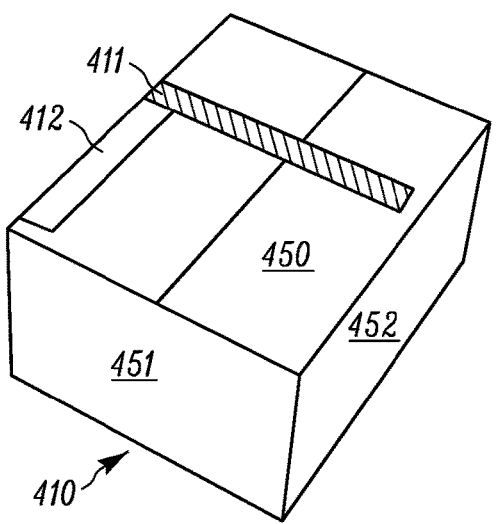

Method 300 will now be discussed with reference to FIGS. 4 to 10. Attention is hence next directed to FIG. 4, which is substantially similar to FIG. 2, with like elements having like numbers. In particular, FIG. 4 depicts a non-limiting implementation of blocks 301, 303, in which dimensioning processor 120 receives a digital image 403 and depth data 405, respectively, from camera 103 and depth sensing device 105, for example in response to processing application 136. FIG. 4 also depicts a box 410 (i.e. a physical object) in a field of view of both camera 103 and depth sensing device 105. Box 410 comprises six sides (three of them visible to both camera 103 and depth sensing device 105: specifically a top 450 and sides 451, 452 extending downward from top 450). Furthermore, as depicted, a top 450 of box 410 visible to both camera 103 and depth sensing device 105 includes labels 411, 412, or the like, that are of a different color than box 410; as well, the top 450 of box 410 includes flaps such that a line visually bisects the top 450 of box 410.

Figure 5:
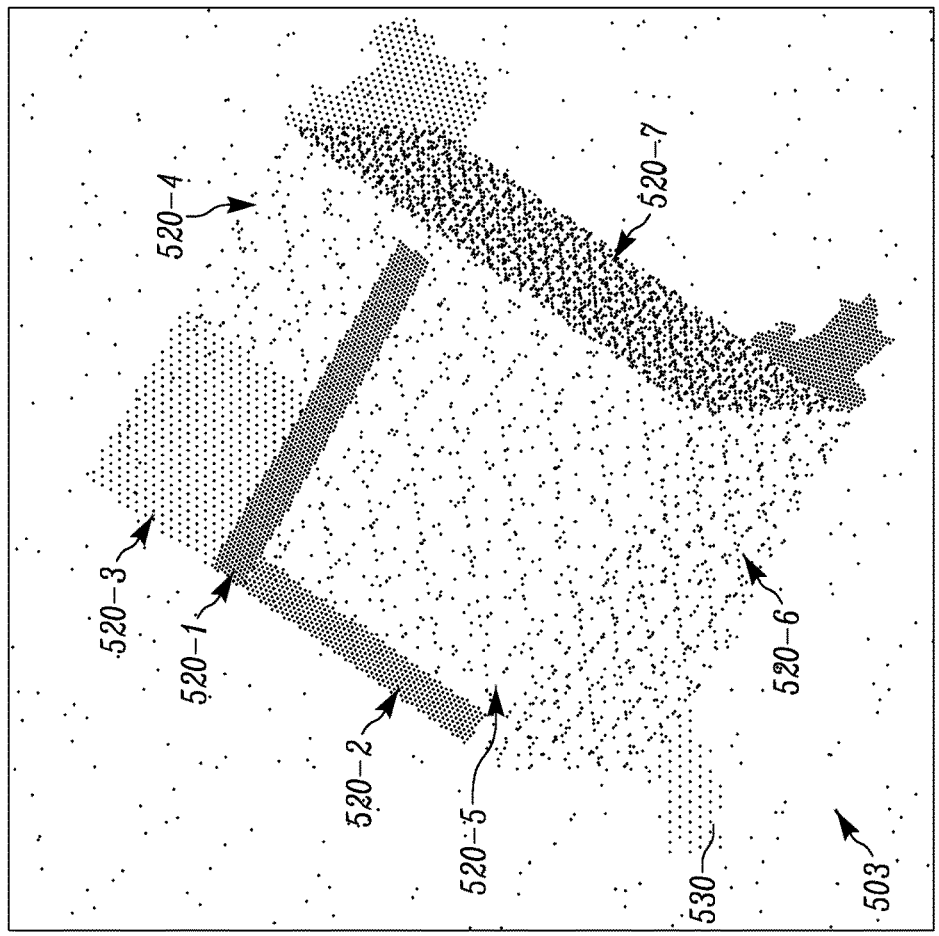
FIG. 5 depicts an example of processing of the data acquired in FIG. 4, in accordance with some implementations.
Figure 5:
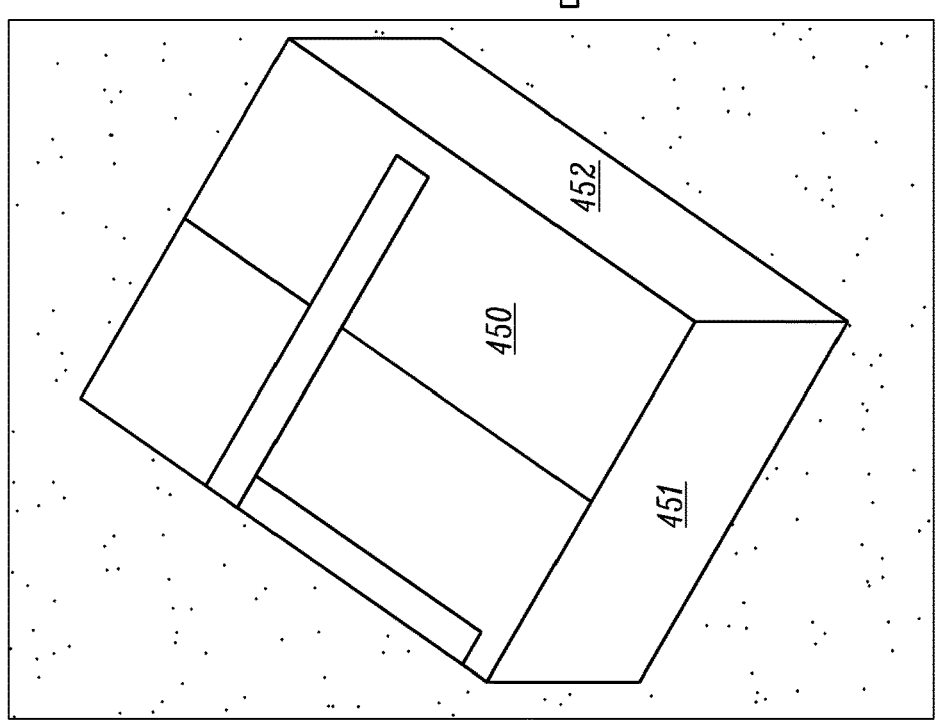
Figure 9:
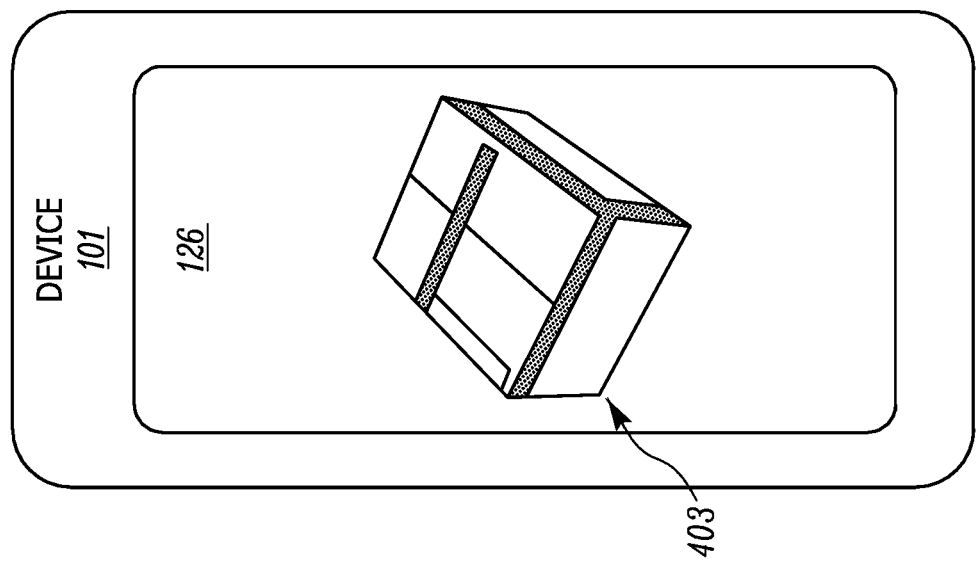
FIG. 9 depicts the device of FIG. 1 rendering a digital image of a physical object as well as dimensions thereof, in accordance with some implementations.
Figure 9:
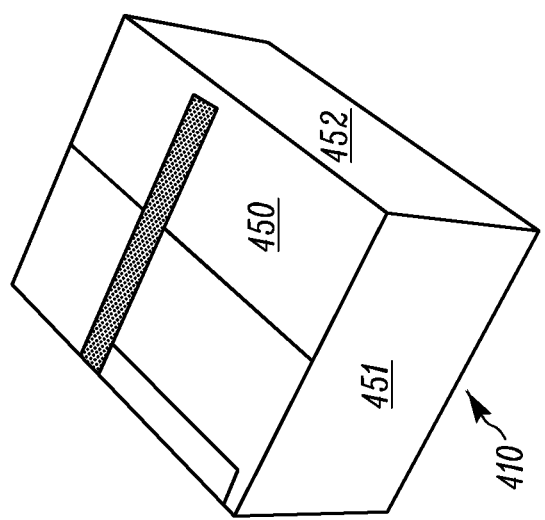

Attention is next directed to FIG. 5 which depicts a non-limiting visual rendering of digital image 403 which results when camera 103 senses box 410 (and/or a physical object); for example the visual rendering of digital image 403 could be rendered at display device 126 (e.g. see FIG. 9). At block 305, dimensioning processor 120 processes digital image 403 to determine segments of shapes belonging to an object identified in the digital image; the term "object" in this instance is used to denote a group of areas and/or a group of pixels in digital image 403 which appear to represent a physical object, for example box 410.

In particular, dimensioning processor 120 processes digital image 403 to search for segments of shapes that can include, but are not limited to, a primitive shape, a plane, a triangle, a square, a rectangle, a circle, a sphere, a polygon, and the like; for example, shapes that can be used to define an object as stored in data 140. In digital image 403 in FIG. 5, each of the top 450 and two visible sides 451, 452 can correspond to polygons and/or rectangles, and at block 305 dimensioning processor 120 determines segments which can make up the polygons or rectangles.

Hence, FIG. 5 also depicts a rendering 503 of digital image 403 after block 305 has been implemented, where segments of shapes identified in block 305 are indicated. It is appreciated that rendering 503 merely represents an intermediate step in the determining of dimensions of the physical object represented by the object in digital image 403, and rendering 503 is not necessarily displayed at display device 126.

In particular, in rendering 503, dimensioning processor 120 has identified a plurality of segments 520-1, 520-2, 520-3, 520-4, 520-5, 520-6, 520-7 in digital image 403, which will be interchangeably referred to hereafter, collectively, as segments 520, and generically as a segment 520. As seen in FIG. 5, edges of segments 520 are not necessarily well defined as image processing algorithms can cause edges and/or corners of box 410 to be unclear, depending on the contrast between sides that form the edges and/or corners, and/or the contrast between box 410 and items in the background of digital image 403.

In any event, dimensioning processor 120 processes digital image 403 to identify segments 520. In some implementations, dimensioning processor 120 can be further configured to preprocess digital image 403 to one or more of: filter image noise; detect edges of the object; segment color; determine morphological features in digital image 403; and determine orientation of lines in digital image 403. Such preprocessing can be performed in order to better identify edges between segments 520 and the like.

In yet further implementations, dimensioning processor 120 can be further configured to preprocess depth data 405 to one or more of: correct for distortions; correct for interference; filter noise; and convert depth data 405 to a point cloud data format. In these latter implementations, further processing of depth data 405 can comprise processing depth data 405 in the point cloud data format.

In some implementations, dimensioning processor 120 can be further configured to filter out one or more of identified shapes and identified segments that are not associated with the object. For example, in rendering 503, various shapes and/or segments are shown, such as segment 530, that are not associated with box 410, which can occur due to lighting of box 410 and/or items adjacent box 410, noise and the like. Such shapes and/or segments can be filtered out.

Indeed, in some implementations, segments 520, 530, and the like, can be compared to data 140-$n$, including data 140 defining various objects and their corresponding properties, to determine which segments 520, 530 to filter out and which segments 520, 530 can be used in method 300. In yet further implementations, data from digital image 403 and depth data 405 are merged to identify segments 520, 530. For example, one or more of data 140, 140-$n$, and application 136, can store properties and/or rules which define objects, and such rules can be used to identify segments 520, 530. For example, such properties can include, but are not limited to, position (e.g. a top plane, a floor plane, side planes, and the like), geometry (a cuboid frame, corner locations, and the like), groupings of similar textures/colors, relations of particular features between corners, between edges/lines, between sides, between texture areas, and the like. Hence, identifying segments can include identifying portions of digital image 403 that delineate different types of areas (e.g. based on color, texture, position), which can be augmented by comparing corresponding depth data 405 to determine whether the segments are part of a same shape belonging to the object or not, as described in further detail hereafter.

In any event, segments 520-1, 520-2 respectively correspond to labels 411, 412, segment 520-3 corresponds to an area defined by label 411 and a flap of the top 450 of box 410, segments 520-4, 520-5 correspond to remaining areas of the top 450 of box 410, and segments 520-6, 520-7 correspond to two sides 451, 452 of box 410 visible to camera 103 and depth sensing device 105. However, from digital image 403 alone, dimensioning processor 120 is generally unable to determine and/or confirm which segments 520 are associated with which shapes of the object; hence dimensioning processor 120 is generally unable to determine and/or confirm which segments 520 are associated with sides 451, 452 and/or a top 450 of box 410; for example while each of segments 520-1, 520-2, 520-3, 520-4, 520-5, together, correspond to a same shape and/or a top 450 of box 410, it is not easily possible to make such a conclusion on the basis of digital image 403 alone.

Hence, at block 307, dimensioning processor 120 processes respective depth data 405 associated with each of segments 520 of the shapes belonging to the object to determine whether each of segments 520 are associated with a same shape. For example, attention is next directed to FIG. 6 which depicts a non-limiting example of an implementation of block 305.

In particular, dimensioning processor 120 can identify adjacent segments 520 of the shapes belonging to the object identified in digital image 403, and compare at least a portion of the respective depth data of the adjacent segments 520. Depth data 405 can be parsed to associate portions of depth data 405 with segments identified in digital image 403, without performing a full three-dimensional mapping using depth data 405, which can be time consuming and/or use excessive processing resources. For example, segments 520-1, 520-2 can be determined to be adjacent shapes as there is no other segment 520 there between. Furthermore, respective depth data associated with each segment 520-1, 520-2 can be compared to determine a relative distance from depth sensing device 105 and/or a relative position in a reference frame.

For example, as depicted, depth data 405 associated with an area 601 of segment 520-1 is compared to depth data 405 associated with an area 602 of adjacent segment 520-2 to determine whether segments 520-1, 520-2 can be combined. Hence, areas 601, 602 of digital image 403 are mapped to depth data 405. While each of areas 601, 602 is depicted as an ellipse, areas 601, 602 can be any shape within a respective segment 520-1, 520-2, and be any size from a pixel to the entirety of a respective segment 520-1, 520-2. Indeed, any portion of respective depth data 405 associated with segments 520-1, 520-2 can be compared to determine whether segments 520-1, 520-2 are associated with a same shape.

For example, portions of respective depth data 405 associated with segments 520-1, 520-2 can be compared to determine whether they form a subset of a same plane (e.g. a top 450 of box 410); as such, respective depth data 405 associated with segments 520-1, 520-2 will generally be about continuous, and/or lie in a same plane and/or are co-planar. In other words, depth data 405 associated with segments 520-1, 520-2 is processed to determine whether it meets criteria for joining them together into a larger super-segment of the same shape belonging to the object. For example, in some implementations, dimensioning processor 120 can be further configured to determine whether each of segments 520-1, 520-2 are associated with a same shape belonging to the object, by: determining, based on respective depth data 405, whether adjacent segments 520-1, 520-2 are co-located with the same shape. Hence, again, respective depth data 405 of adjacent segments 520-1, 520-2 is processed to determine whether the respective depth data 405 is co-planar.

Figure 6:
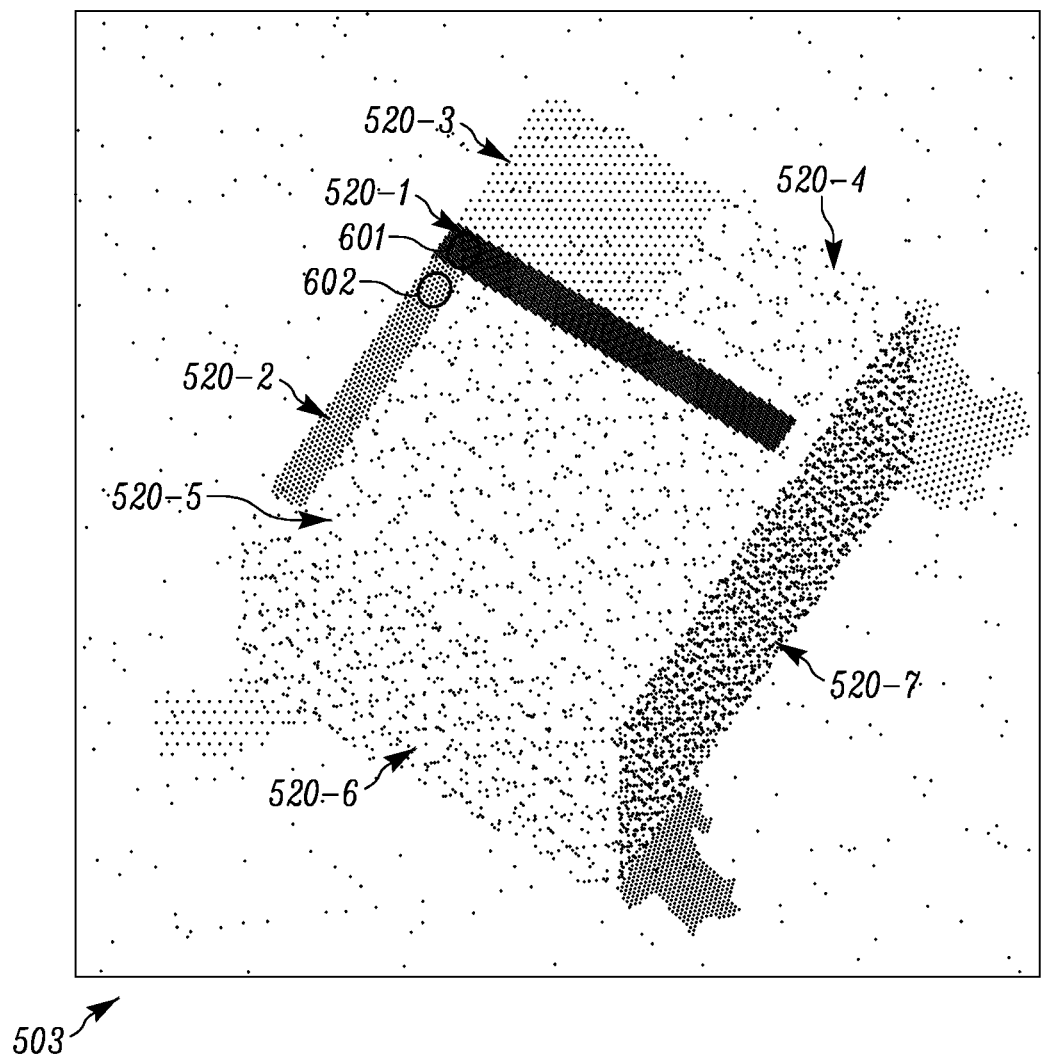
FIG. 6 depicts an example of further processing of the data acquired in FIG. 4, in accordance with some implementations.
Figure 7:
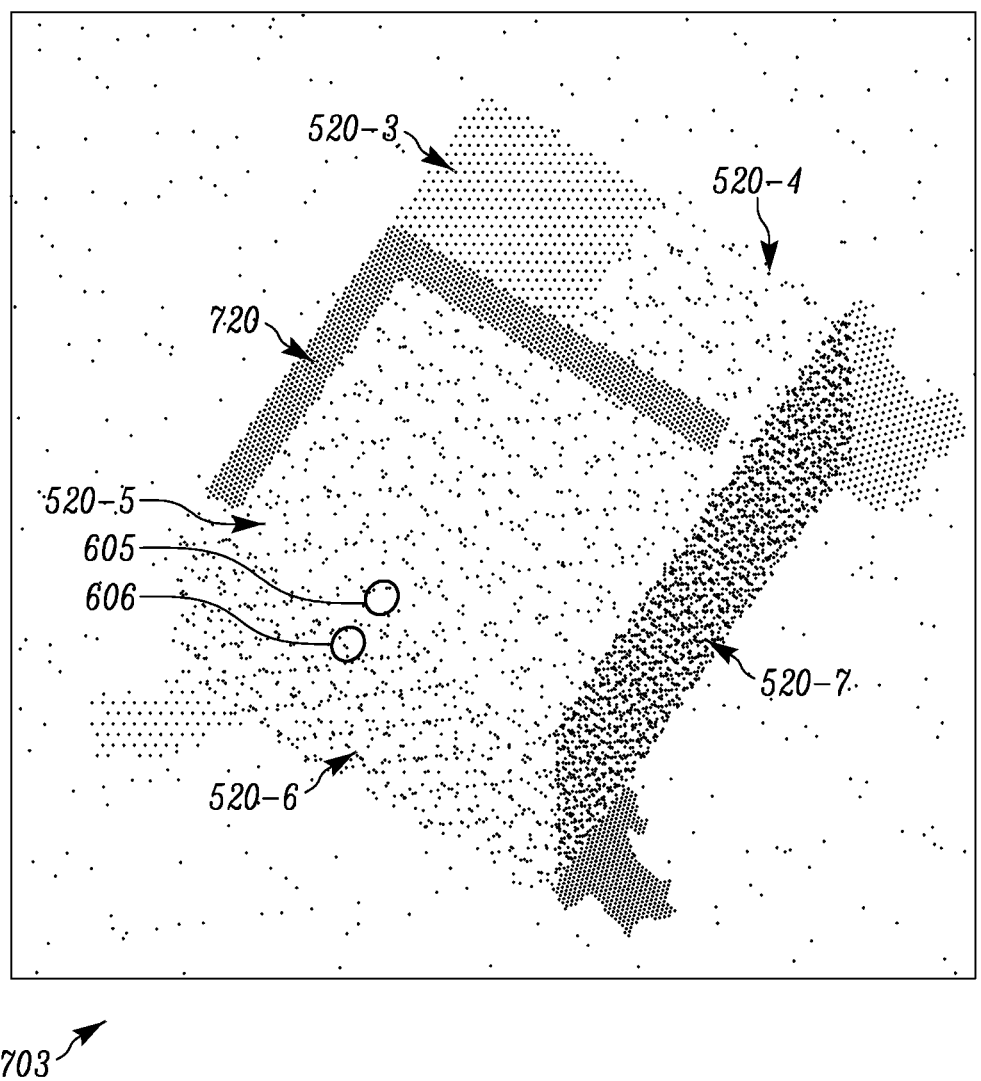
FIG. 7 depicts an example of further processing of the data acquired in FIG. 4, in accordance with some implementations.

Such a super-segment 720 is depicted in FIG. 7, which is substantially similar to FIG. 6, with like elements having like numbers; however, FIG. 7 depicts a non-limiting visual rendering 703 of digital image 403 which results when, segments 520-1, 520-2 have been joined into a larger super-segment 720; specifically, rendering 703 is derived from rendering 503, but in rendering 703 segments 520-1, 520-2 have been joined into a larger super-segment 720. It is appreciated that rendering 703 merely represents an intermediate step in the determining of dimensions of the physical object represented by the object in digital image 403, and rendering 703 is not necessarily displayed at display device 126.

FIG. 7 also depicts areas 605, 606, similar to areas 601, 602, but associated respectively with segments 520-5, 520-6. Again, areas 605, 606 can be larger or smaller than depicted. Furthermore, portions of respective depth data 405 associated with segments 520-5, 520-6 can be compared to determine whether they form a subset of a same plane (e.g. a top 450 of box 410). However, as respective depth data 405 associated with segments 520-5, 520-6 indicate, for example, that segments 520-5, 520-6 are not co-planar, it is determined that segments 520-5, 520-6 are part of different shapes, and not part of the same shape.

In any event, dimensioning processor 120 can be configured to iterate through all adjacent segments of segments 520 to determine whether the adjacent segments can be joined into a larger super-segment of the same shape. As such, dimensioning processor 120 can determine that all of segments 520-1, 520-2, 520-3, 520-4, 520-5 can be joined together into a larger super-segment. For example, attention is next directed to FIG. 8 which depicts a non-limiting visual rendering 803 of digital image 403 which results once all segments 520 are processed to determine their respective associations with the shapes of the object in digital image 403. It is appreciated that rendering 803 merely represents an intermediate step in the determining of dimensions of the physical object represented by the object in digital image 403, and rendering 803 is not necessarily displayed at display device 126.

Specifically, rendering 803 is derived from renderings 503, 703 but in rendering 803, segments 520-1, 520-2, 520-3, 520-4, 520-5 have been joined into a larger super-segment 820.

Figure 8:
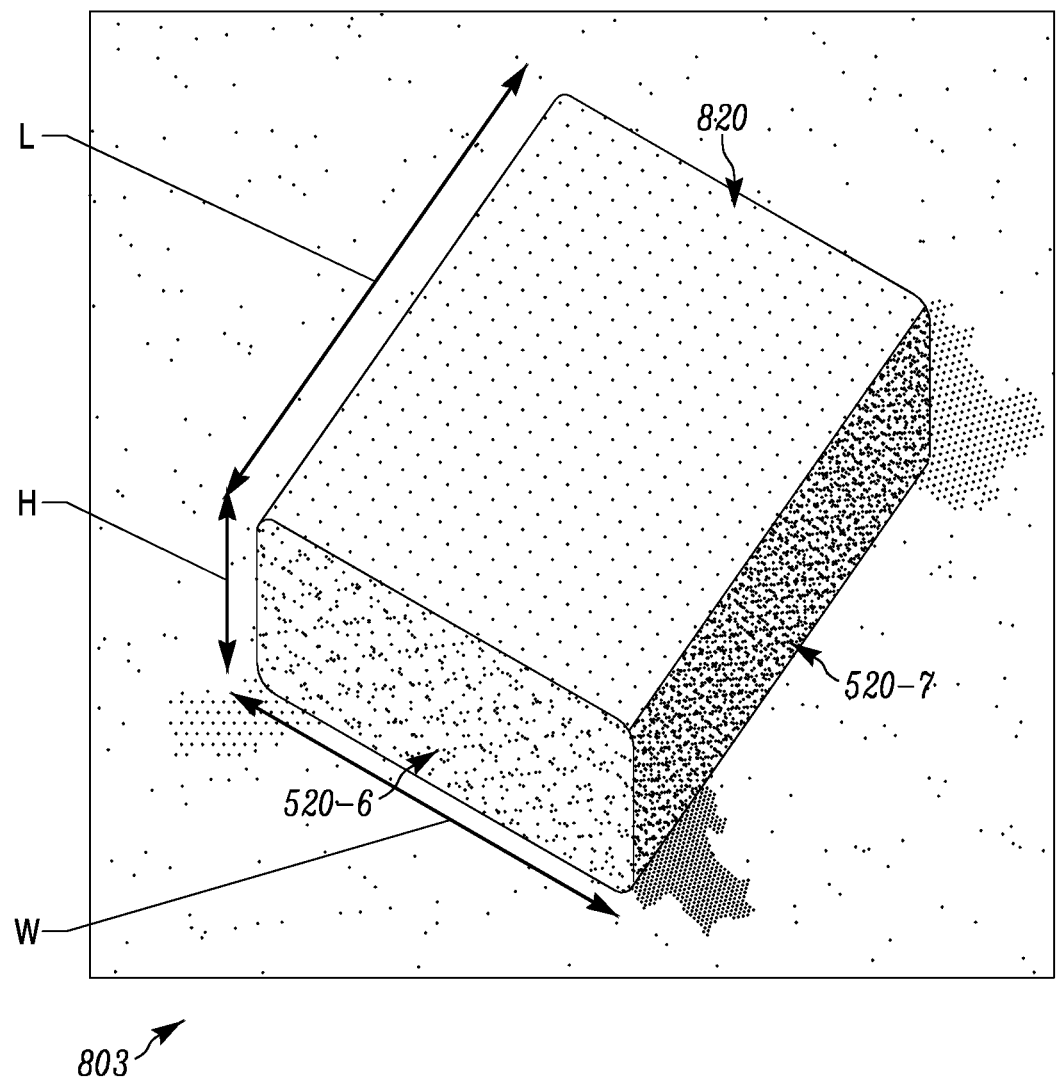
FIG. 8 depicts an example of further processing of the data acquired in FIG. 4, in accordance with some implementations.

For example, in FIG. 8, dimensioning processor 120 has iterated through all of segments 520-1, 520-2, 520-3, 520-4, 520-5 (as well as segments 520-6, 520-7) and determined that segments 520-1, 520-2, 520-3, 520-4, 520-5 are all associated with a same shape, which can be associated with a top 450 of box 410. Alternatively, after super-segment 720 is formed, dimensioning processor 120 iterates through the remaining segments and determines that segments 520-3, 520-4, 520-5 are to be joined with super-segment 720 to form super-segment 820.

During the iteration, dimensioning processor 120 has further determined that segments 520-6, 520-7 are not associated with a same shape as segments 520-1, 520-2, 520-3, 520-4, 520-5 (and/or super-segment 720). Hence, in FIG. 8, dimensioning processor 120 has further determined that segments 520-6, 520-7 each, independently form a respective shape, and have hence not been joined with other segments 520.

Once all segments 520 are processed to determine their respective associations with the shapes of the object in digital image 403 (e.g. as determined at block 309), at block 311 dimensioning processor 120 computes dimensions of the object based on the respective depth data and the respective associations of the shapes. Dimensioning processor 120 can compare data represented by rendering 803 with data 140 to determine that the physical object represented by the object in digital image 403 represents a box (e.g. box 410), and determine dimensions of the box using any dimensioning algorithm.

For example, again with attention to FIG. 8, sides of segments 520-6, 520-7, 820 of rendering 803 corresponding to sides of the box can be identified and dimensions thereof determined from depth data 405. In FIG. 8 edges of segments 520-6, 520-7, 820 corresponding to height (H), length (L) and width (W) of the box are determined and indicated (for example, based on identifying intersections of adjacent non-coplanar shapes of the object from the depth data), and dimensions of edges H, L, W can be determined from depth data 405, by the correlation between depth data 405 and digital image 403 and/or a correlation between depth data 405 and edges H, L, W identified in rendering 803. In other words, dimensioning processor 120 can be further configured to determine geometry of the object based on relative location of segments 520 of the object in digital image 403 and in depth data 405. From the geometry, the dimensions can be determined.

When the dimensions have been determined, dimensioning processor 120 can render the dimensions at display device 126. For example, attention is next directed to FIG. 9 which depicts a perspective front view of device 101 in use; specifically, box 410 is in a field of view of camera 103 and depth sensing device 105 (on a rear side of device 101, and hence not visible in FIG. 9), and method 300 has been used to determine dimensions of box 410. Dimensioning processor 120 hence controls display device 126 to render digital image 403 showing box 410, as well as determined dimensions of box 410. As depicted, lines corresponding to a height, a length and width of box 410 are also rendered at display device 126 with respective dimensions thereof also shown. As those of skill in the art will realize, object volume may also be computed and displayed based on the determined dimensions as well as data 140 defining the object.

Figure 10:
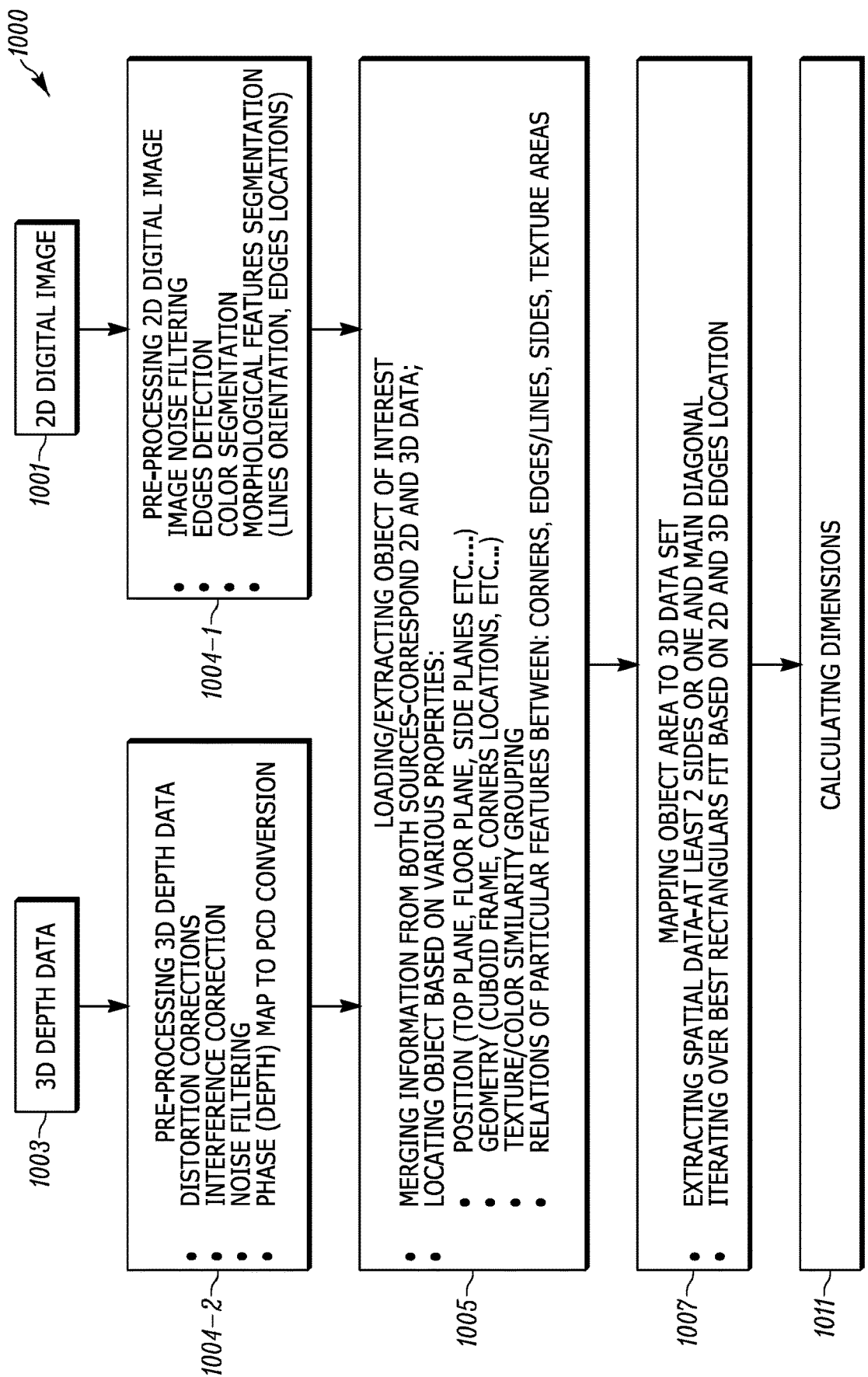
FIG. 10 is a flowchart of a method of dimensioning using digital images and depth data, in accordance with some implementations.

Attention is next directed to FIG. 10, which depicts an alternative of method 300; specifically FIG. 10 depicts a block diagram of a flowchart of a method 1000 for dimensioning using digital images and depth data, according to non-limiting implementations, according to non-limiting implementations. In order to assist in the explanation of method 1000, it will be assumed that method 1000 is performed using device 101, and specifically by dimensioning processor 120 and when dimensioning processor 120 processes instructions stored at memory 122, for example application 136. Indeed, method 1000 is one way in which device 101 can be configured. Furthermore, the following discussion of method 1000 will lead to a further understanding of device 101, and its various components. However, it is to be understood that device 101 and/or method 1000 can be varied, and need not work exactly as discussed herein in conjunction with each other, and that such variations are within the scope of present implementations.

Regardless, it is to be emphasized, that method 1000 need not be performed in the exact sequence as shown, unless otherwise indicated; and likewise various blocks may be performed in parallel rather than in sequence; hence the elements of method 1000 are referred to herein as "blocks" rather than "steps". It is also to be understood, however, that method 1000 can be implemented on variations of device 101 as well.

At blocks 1001, 1003, dimensioning processor 120 receives, respectively from camera 103 and depth sensing device 105, image data and depth data. Blocks 1001, 1003 respectively correspond to blocks 301, 303 of method 300. Furthermore, in method 1000, image data can be interchangeably referred to as two-dimensional (2D) data, and depth data can be interchangeably referred to as three-dimensional (3D) data. Indeed, in general, data from camera 103 is two-dimensional and can comprise an array of two-dimensional color coordinates and/or brightness coordinates; similarly, in general, data from depth sensing device 105 is three-dimensional and can comprise a two-dimensional array of depth coordinates (i.e. each element in the two-dimensional array is associated with a corresponding depth).

At blocks 1004-1, 1004-2, dimensioning processor 120 can respectively preprocess the 2D data and the 3D data. For example, preprocessing the 2D digital image at block 1004-1 can include, but is not limited to, image noise filtering, edges detection, color segmentation, morphological feature segmentation (e.g. line orientation, edge orientation, etc.), and the like. Preprocessing the 3D depth data at block 1004-2 can include, but is not limited to, distortion corrections, interference corrections, noise filtering, phase (depth) map to point cloud data (PCD) conversion, and the like At block 1005, dimensioning processor 120 locates and/or extracts an object of interest from the 2D data and the 3D data by merging the 2D data and the 3D data and locating the object based on properties stored, for example, in data 140 and/or based on properties configured in application 136. Such properties can include, but are not limited to, position (e.g. a top plane, a floor plane, side planes, and the like), geometry (a cuboid frame, corner locations, and the like), groupings of similar textures/colors, relations of particular features between corners, between edges/lines, between sides, between texture areas, and the like. Indeed, locating objects and/or segments associated with an object in a digital image can hence include processing both the digital image and the depth data to find such segments and/or objects. Hence block 1005 corresponds to block 305 of method 300.

At block 1007, dimensioning processor 120 can map an object area, for example in the digital image, the 3D depth data (e.g. referred to in block 1007 as the 3D data set). Such mapping can include, but is not limited to, extracting spatial data from the 3D data set, which can include extracting at least two sides, extracting one side and one main diagonal, and the like; in other words, sufficient spatial data is extracted to characterize the object without performing a full three-dimensional mapping. The degree of data that is sufficient to characterize a given type of object can be defined in data 140-$n$; in other words, for given type of object, data 140-$n$ includes rules for determining a degree of mapping that is to occur to map an object area. Further at block 1007, dimensioning processor 120 iterates over one or more best fits of segments, including but not limited to best rectangular fits, based on edge locations in the 2D digital image and the 3D depth data. In general, block 1007 corresponds to block 307 of method 300.

While not depicted, it is assumed in method 1000 that the iteration of block 1007 occurs until all identified segments have been processed as described above; hence, block 1007 inherently also corresponds to block 309 of method 300.

At block 1011, dimensioning processor 120 can then calculate and/or determine dimensions of the physical object represented by the object in the 2D digital image and the 3D depth data. Hence, block 1011 corresponds to block 311 of method 300.

Thereafter, dimensioning processor 120 can control display device 126 to one or more of: render the digital image; identify the object in the digital image; and render the dimensions of the object.

Hence, described herein is a device which uses a combination of a digital image and corresponding depth data, respectively acquired using a camera device and a depth sensing device, to determine dimensions of a physical object in a field of view of the camera device and the depth sensing device. By correlating features in the digital image and the depth data, the problems with dimensioning using only a 2D digital image or only 3D depth data can be obviated.

In the foregoing specification, specific implementations have been described. However, one of ordinary skill in the art appreciates that various modifications and changes can be made without departing from the scope of the specification as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some implementations may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an implementation can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

I claim:

1. A device comprising:
   a camera configured to acquire a digital image in a field of view;
   a depth sensor configured to acquire depth data across at least a portion of the field of view; and
   a dimensioning processor configured to:
      determine segments of shapes belonging to an object identified in the digital image, wherein each of the segments of shapes has an area;
      based on the depth data associated with each of the segments of shapes belonging to the object, determine whether the segments of shapes are associated with a same shape belonging to the object; and
      compute a dimension of the object based on the depth data and the segments of shapes being associated with the same shape belonging to the object,
      wherein the dimensioning processor is configured to determine whether the segments of shapes are associated with the same shape belonging to the object by iterating through adjacent segments of shapes to determine whether the adjacent segments of shapes can be joined into a larger super-segment of the same shape.

2. The device of claim 1, wherein the dimensioning processor is configured to determine whether the segments of shapes are associated with the same shape belonging to the object by:
identifying adjacent ones of the segments of shapes belonging to the object identified in the digital image; and
comparing at least a portion of the depth data of the adjacent ones of the segments of shapes.

3. The device of claim 1, wherein the dimensioning processor is configured to determine whether the segments of shapes are associated with the same shape belonging to the object by determining, based on the depth data, whether the adjacent segments of shapes are co-located within the same shape.

4. The device of claim 1, wherein the dimensioning processor is configured to filter out identified shapes and identified segments of shapes that are not associated with the object.

5. The device of claim 1, further comprising a display device, the dimensioning processor configured to control the display device to:
render the digital image;
identify the object in the digital image; and
render the dimension of the object.

6. The device of claim 1, further comprising memory, wherein data defining the object is stored in a container in the memory, the container being one of a plurality of containers stored in the memory, each of the plurality of containers defining different objects.

7. The device of claim 6, wherein the data defining the object comprises stereometric properties including a set of qualitative descriptions of the object that uniquely characterize the object in three-dimensions.

8. The device of claim 1, wherein the dimensioning processor is configured to determine geometry of the object based on a location of the segments of shapes in the digital image and on the depth data.

9. The device of claim 1, wherein the shapes comprise one or more of a primitive shape, a plane, a triangle, a square, a rectangle, a circle, a sphere, and a polygon.

10. The device of claim 1, wherein the dimensioning processor is configured to preprocess the digital image to one or more of filter image noise, detect edges of the object, segment color, determine morphological features in the digital image, and determine orientation of lines in the digital image.

11. The device of claim 1, wherein the dimensioning processor is configured to preprocess the depth data to one or more of correct for distortions, correct for interference, filter noise, and convert the depth data to point cloud data format.

12. The device of claim 1, wherein the camera device comprises a red-green-blue digital camera.

13. The device of claim 1, wherein the depth sensor device comprises one or more of a structured light camera, a time-of-flight camera, stereo vision camera, an active stereo vision camera, a passive stereo vision camera, a stereoscopic camera, and a light detection and ranging device.

14. The device of claim 1, wherein the dimensioning processor is configured to access memory, the memory storing data defining the object, and identify the object within the digital image by comparing the digital image with the data defining the object, wherein the data defining the object comprises stereometric properties of the object, the stereometric properties comprising a set of quantitative descriptions of the object having numerically expressed parameters that uniquely characterize the object in three-dimensions.

15. A method comprising:
at a device comprising a camera configured to acquire a digital image in a field of view, a depth sensor configured to acquire depth data across at least a portion of the field of view, and a dimensioning processor:
determining, by the dimensioning processor, segments of shapes belonging to an object identified in the digital image, wherein each of the segments of shapes has an area;
based on the depth data associated with the segments of shapes belonging to the object, determining, by the dimensioning processor, whether the segments of shapes are associated with a same shape belonging to the object; and
computing, by the dimensioning processor, a dimension of the object based on the depth data and the segments of shapes associated with the same shape belonging to the object,
wherein determining whether the segments of shapes are associated with the same shape belonging to the object comprises iterating through adjacent segments of shapes to determine whether the adjacent segments of shapes can be joined into a larger super-segment of the same shape.

16. The method of claim 15, wherein determining whether the segments of shapes are associated with the same shape belonging to the object comprises:
identifying adjacent ones of the segments of shapes belonging to the object; and
comparing at least a portion of the depth data of the adjacent ones of the segments of shapes.

17. The method of claim 15, wherein determining whether the segments of shapes are associated with the same shape belonging to the object comprises determining, based on the depth data, whether the adjacent segments of shapes are co-located within the same shape.

18. The method of claim 15, further comprising accessing memory, the memory storing data defining the object, and identifying the object within the digital image by comparing the digital image with the data defining the object, wherein the data defining the object comprises stereometric properties of the object, the stereometric properties comprising a set of quantitative descriptions of the object having numerically expressed parameters that uniquely characterize the object in three-dimensions.

19. A non-transitory computer-readable medium storing a computer program, wherein when executed, the computer program causes a device including a camera, a depth sensor, and a processor to:
acquire a digital image in a field of view;
acquire depth data across at least a portion of the field of view of the camera; and
determine segments of shapes belonging to an object identified in the digital image, wherein each of the segments of shapes has an area;
based on the depth data associated with the segments of shapes belonging to the object, determine whether the segments of shapes are associated with a same shape belonging to the object;

compute a dimension of the object based on the depth data and the segments of shapes associated with the same shape belonging to the object, wherein the program further causes the device to:
 access memory, the memory storing data defining the object;
 identify the object within the digital image by comparing the digital image with the data defining the object, wherein the data defining the object comprises stereometric properties of the object, the stereometric properties comprising a set of quantitative descriptions of the object having numerically expressed parameters that uniquely characterize the object in three-dimensions.

* * * * *